United States Patent Office 3,038,895
Patented June 12, 1962

3,038,895
WATER-DISPERSIBLE, PARTIALLY SUBSTITUTED DERIVATIVES OF AMYLOSE
Morton W. Rutenberg, North Plainfield, and Wadym Jarowenko and Lawrence J. Ross, Plainfield, N.J., assignors to National Starch and Chemical Corporation, a corporation of Delaware
No Drawing. Filed Dec. 6, 1957, Ser. No. 700,980
5 Claims. (Cl. 260—233.3)

This invention relates to a method for producing water-dispersible derivatives of amylose, and to the products thereby produced. It is our particular object to provide amylose derivatives characterized by a unique combination of properties, namely ready dispersibility in water, stability of the aqueous dispersions against thickening and gelling upon standing, and especially, the ability of these stable, aqueous dispersions to form water-resistant films.

It is well known that starch is composed of two fractions, the molecular arrangement of one being linear and the other being branched. The linear fraction of starch is known as amylose, and the branched fraction as amylopectin. Methods for separating starch into these two components are known. Starches from different sources (e.g. potato, corn, waxy maize, tapioca, etc.) are characterized by different relative proportions of the amylose and amylopectin components. Some starches have been genetically developed which are characterized by a large preponderance of the one fraction over the other.

There is at present no starch commercially available in original granular form which contains more than about 30% of amylose, although starch types with higher amylose contents may subsequently become available. When we use the term "amylose," for the purposes of this invention, we refer to the amylose resulting from the fractionation of the amylose and amylopectin components of starch, or to whole starch which is composed of at least 50% amylose. The latter, because of its high amylose content, offers the advantages and presents the problems (solved by this invention) found in substantially pure amylose.

Ordinary starch (that is, starch derived from corn, tapioca, potato, sago and similar plant forms, and containing from about 17% to about 34% amylose) may be dispersed quite easily in water, merely by heating. Heating the aqueous suspension of the starch causes the individual granules to swell until the internal organization of each granule is destroyed (this being the well known phenomenon of gelatinization), and a hydrated colloidal dispersion of the starch is thus obtained. When a film is formed from such a dispersion (as for example by casting on glass and drying), the dry film is not resistant to water. Upon soaking in water the film is quickly destroyed. This of course is a severe limitation upon the usefulness of ordinary starches where water resistant films are required.

On the other hand, amylose forms films which are notably water resistant, and therefore amylose would suggest itself wherever a water resistant film was required, whether this be in the nature of a self-supporting film of the "cellophane" type, or a coating upon some other surface, or as a bonding agent between two surfaces. Furthermore, films formed from amylose are notably more flexible than those made from starch.

It is self-evident that in order to cast films from either starch or amylose, these products would first have to be in a state of dispersion in some fluid. Thus, cooking ordinary starch in water provides a fluid dispersion from which a film may then be cast.

One reason for the lack of general acceptance of amylose as a source of water resistant films, heretofore, has been the difficulty of forming aqueous dispersions of amylose. Unlike starch, which disperses rapidly upon heating in water, mere cooking in water will not disperse amylose completely. When amylose is heated in water at low concentrations (say 10% solids), under super-atmospheric pressure (about 75 lb. gauge pressure in an autoclave), it does form a dispersion. However, this dispersion is quite unstable, in the sense that it forms a solid gel upon cooling. It is seen therefore that the aqueous method of dispersing amylose suffers from at least two disadvantages, namely, the need for pressure equipment and the poor viscosity stability of the resultant dispersions.

Some chemicals are known to be dispersants for amylose (as for example strong caustic solutions, certain acids, concentrated salt solutions, primary amines and amino-alcohols), but the use of such dispersions as film forming media is unsatisfactory because their expense makes them economically uninteresting or because the dispersants interfere with the ultimate use of the amylose, for reasons of alkalinity, acidity, toxicity or odor. Furthermore some of these dispersants degrade the amylose; others result in films of reduced water resistance.

The reason for the difficulty in dispersing amylose is believed to be the linear configuration of the amylose molecules. This linearity allows the molecules to align themselves, forming many hydrogen bonds between the aligned chains, and thus becoming insoluble in water. This accounts for the difficulty in dispersing amylose in water (whether the amylose be the result of the fractionation of starch or whether it is part of a whole starch containing a high amylose ratio); it also explains the tendency of dispersed amylose to gel or precipitate, and it is the reason for the water insolubility of films formed from amylose. It is seen, therefore, that the dispersibility, dispersion stability and film solubility of amylose are inter-related and are determined by the relative linearity of the amylose molecule.

Our objective therefore was to devise an economically feasible means for producing an amylose derivative which could be dispersed readily in water without the need for temperatures above 130° C., and whose dispersion would be viscosity stable (that is, one which would not thicken and gel immediately upon cooling below the dispersing temperature) and would nevertheless form films of excellent water resistance.

We found that our objective could be achieved by means of a limited disruption of the linearity of the amylose molecule, resulting from the introduction of a controlled and critical amount of branching through substituent groups. This is done by reacting the amylose, through covalent bonding, under conditions of substantially complete, uniform molecular dispersion, with either esterification or etherification reagents, so as to introduce substituent branches on the amylose molecule. By limiting the degree of substitution within a critical range, we obtain an amylose which is easily dispersible in water to give dispersions which are relatively stable and do not gel, and which form water-resistant films.

The particular type of substituent used is not a critical factor, although different substituent groups may differ from one another in the amount that is necessary to achieve the desired properties in the amylose. The essence of our invention lies in the introduction of a controlled amount of branching in the amylose molecule, by the introduction of substituent groups.

If the substitution is to be achieved by esterification, then the amylose may be reacted with an organic acid anhydride, mixed anhydride, acid halide, or other known esterification reagent, preferably in the presence of an esterification catalyst. The resulting product is of course an amylose ester. Thus, anhydrides such as acetic, propionic, butyric and isobutyric anhydrides would result in amylose acetate, propionate, butyrate and isobutyrate, respectively.

The introduction of branches on the amylose molecule may also be achieved by an etherification reaction. Thus, amylose, preferably in an alkaline medium, may be treated with an etherification reagent which will react with the hydroxyl groups of the amylose through an ether linkage. Suitable etherification reagents include acrylonitrile, dimethyl sulfate, monochloracetic acid, benzyl chloride, propylene oxide and allyl bromide.

As stated, not any degree of esterification or etherification of amylose will result in the achievement of the desired unique combination of properties, namely, water dispersibility, stability of aqueous dispersions, and the ability to form water-resistant films. If there is too low or too high a degree of substitution in the final product (that is, too little or too much branching on the amylose molecule) this combination of properties is not achieved. The term "degree of substitution" may be defined as the number of moles of substituent groups per anhydroglucose unit of the amylose. We have found that the operative range of the degree of substitution, for the purposes of this invention, is from 0.02 to 0.15. It has already been pointed out that different substituent groups (e.g., acetyl, benzyl, cyanoethyl, carboxymethyl, etc.) vary in the amounts of such groups necessary to achieve the required combination of properties, and therefore they do not all have precisely the same upper and lower limits. However, the determination of such limits for any one particular substituent is a matter of simple experimentation, and the range 0.02 to 0.15 is believed to encompass, with reasonable variations, all types of substituent groups.

If the degree of substitution is too low, we have found that the amylose derivative will not form stable dispersions in water. In other words, although it may be possible to disperse such products in water by simple mild heating (unlike untreated amylose), the resulting dispersions soon thicken to a useless gel. If the degree of substitution goes beyond a certain upper limit, then it is found that films cast from the resulting aqueous dispersions of the derivatives are no longer water resistant.

The above-noted degree of substitution, required to achieve the remarkable combination of properties, is too low to affect the essential characteristics of the amylose adversely. In other words, an ester or ether of amylose, within the degree of substitution stated, gives films which are substantially as strong as those of untreated amylose, the only discernible changes being in the advantageous direction already discussed, namely, easier water dispersibility, stability, and water resistance of films.

Before presenting specific examples of the manufacture of the herein described types of amylose esters and ethers, we shall describe the procedures of esterification and of etherification in more general terms.

Whether one is dealing with an esterification or etherification reaction, it is in any case important that the amylose first be dispersed in a carrier medium, which may be aqueous or non-aqueous. It is desirable that the dispersion of the amylose be as complete and uniform as possible, in order to achieve the most uniform substitution in the subsequent esterification or etherification reaction. Besides dispersing amylose by heating in water at super-atmospheric pressure (which we have already indicated to be of limited usefulness because of the almost immediate gelling of the amylose dispersion), it is also possible to form uniform dispersions of amylose in other media. Thus amylose may be dispersed in dimethylsulfoxide, concentrated sodium hydroxide solution, certain primary amines (e.g., ethylamine, methylamine), certain amino alcohols, (e.g., aminoethanol), mixtures of hot aqueous formamide and dimethyl-formamide, hot aqueous formaldehyde solutions, concentrated aqueous solutions of salts (as for example 50% calcium chloride and 50% calcium nitrate), and some acids such as phosphoric or aqueous formic acid. However, it is important, for the purpose of the esterification or etherification reaction of this invention, that the dispersion medium chosen be one which does not substantially interfere with the particular esterification or etherification reaction being run (in order to avoid undesired side effects). Thus, we prefer as the dispersion media for amylose either dimethylsulfoxide or a concentrated aqueous solution of an alkali metal hydroxide such as sodium hydroxide.

At this point we should like to clarify what might appear to be somewhat of an inconsistency. At the beginning of this discussion, we indicated a number of possible dispersants for ordinary, untreated amylose, and indicated that these suffered from various disadvantages, such as expense, odor, toxicity, or the like. Now, as part of the etherification or esterification reaction, we speak of using these very same dispersants as a carrier medium and dispersant for the amylose during the reaction. The difference is, of course, that in the first case the dispersant is an integral part of the amylose composition, and remains with it until the ultimate film or coating is formed. In the latter case (that is, the reaction of this invention) the dispersant is only temporarily in contact with the amylose; as soon as the esterification or etherification has been effected, the amylose derivative is removed from the reaction mass, and the dispersant can ordinarily be recovered by known means and re-employed. The ultimate amylose derivative of our invention does not need to be dispersed in any of the above-mentioned chemicals; ordinary water is all that is required.

In preparing amylose for esterification, we have found that one of the best dispersants is dimethylsulfoxide. Thus, one part by weight of amylose may be suspended in 4 to 6 parts by weight of the dimethylsulfoxide and dispersed by agitating at room temperature for approximately 2 hours. To the amylose dispersion (made in this or any other way) there is then added an esterification catalyst, which is in practice an alkaline material of organic or inorganic nature. Thus one might use pyridine, or preferably triethylamine, or (if dealing with an aqueous system) an alkali metal hydroxide. Then the organic acid anhydride is added, as the esterification reagent. The amount of the anhydride to be added will be determined by the degree of substitution desired. The alkaline material (i.e., the "acid-acceptor") is preferably used in slight molar excess over the acid anhydride.

Mere agitation at room temperature for as little as one or two hours is all that is ordinarily required to bring the reaction to completion. The amylose ester is then easily separated from the reaction mass by pouring the entire mass into an excess of alcohol (e.g., ethyl alcohol), whereupon the amylose ester precipitates and may be filtered off, dried (by standing in air or any suitable drying means) and ground to desired mesh size. Other suitable methods of isolating the amylose derivative may be employed, such as drying the reaction mass over heated drums, cooling the reaction mass below the retrogradation point, or the like.

In the case of etherification reactions the dispersion of amylose is treated with a suitable etherification reagent, in the presence of an alkaline material. If the amylose had originally been dispersed in a concentrated aqueous solution of sodium hydroxide or other strong alkali, then the addition of any other alkaline material is of course unnecessary, and all that needs to be added is the etherification reagent itself. Here again, the amount of etherification reagent to be used is determined on the basis of the degree of substitution desired. Agitation is continued until the reaction is complete. If the reaction mass is highly alkaline, it is neutralized with an acid (such as glacial acetic acid) and then poured into an excess of alcohol to precipitate the amylose ether. The precipitate is then dried and ground, if desired.

Whether the substitution of the amylose is achieved through an esterification or etherification reaction, it is important that the amylose, when being subjected to the reaction, be in a uniformly and completely dispersed state. If the reaction is run on an incompletely dispersed amylose, the resultant product does not have the properties desired, especially the ability to disperse uniformly in water at relatively low temperatures, and the stability of the dispersions is not satisfactory.

The following examples will further illustrate the embodiment of our invention.

*Example I*

In this, and in the following examples, all parts given are by weight, unless otherwise specified.

100 parts amylose were mixed with 567 parts dimethylsulfoxide. After approximately two hours of continuous agitation, at room temperature to insure uniform dispersion, there were added 4 parts triethylamine, followed by slow addition of four parts of acetic anhydride. The mixture was agitated for an additional two hours, at which time the reaction mass was poured into an excess of ethyl alcohol. The amylose acetate thereupon precipitated from the alcohol, and was filtered off, dried in a current of warm air, and ground to approximately 20 mesh.

The degree of substitution of this product (hereinafter referred to as "D.S.") was 0.042.

In order to test the water-dispersibility of the product, and the stability of the dispersions, 5 parts of the above product were mixed with 45 parts of hot water, and heated in a boiling water bath for up to 30 minutes, with agitation. The amylose was found to be thoroughly and uniformly dispersed in the water, and the container was covered and allowed to remain at room temperature. It was watched constantly in order to note the time when gelling of the dispersion would start. In the case of this product, gelling was not discernible until at least 30 minutes had passed after the dispersion had been removed from the bath.

In order to test the water resistance of films cast from aqueous dispersions of the amylose derivative, two tests were run. In both cases a portion of the hot dispersion of the amylose derivative, containing 10% solids, was poured onto a polished glass plate. The fluid was permitted to find its own level by gravity, with no spreading by rod or other means. When first cast upon the glass, the wet films had a cloudy appearance, but after being allowed to dry by standing in air at room temperature, the films became glass-clear and glossy. In one test, which we call the "Immersion Test," the film is stripped off the glass plate, and immersed in water at room temperature for two hours. At the end of this period the strips are removed from the water and examined. If no disintegration of the film is evident, it is considered water resistant. If only partial disintegration is noted, the film is considered partially resistant to water. If the film has undergone substantial disintegration after two hours immersion, it is considered to have poor resistance to water.

Another test for water resistance of films is known as the "Rub Test." In this case, one does not strip the dry film from the glass, but rather, a moistened finger is rubbed over the amylose film. If the film has only partial water resistance it will become slippery to the touch; if the film is very soluble in water the feel will not only be slippery, but one will quickly strike through to the glass. On the other hand, if the film is sufficiently water resistant, there will be no slippery feel, and of course the finger will not strike through to the glass.

The two types of water resistance tests, namely, immersion and rub, were always found to be consistent with one another. In other words, if a given film was found to be water resistant by one test, it was also indicated to be water resistant by the other.

In the case of the amylose acetate of this example, both tests showed the film to be insoluble in water, and therefore to have excellent water resistance.

It is seen therefore, that the relatively slight degree of treatment with acetic anhydride caused the amylose to become easily dispersible in water to provide dispersions that were considerably more stable than those formed by dispersing amylose in water under heat and pressure, and the films cast from the dispersion of this amylose derivative had excellent resistance to water.

In order to test the strength of the dried films of the amylose derivative of this example, we used the Instron Tensile Tester, sold by the Instron Engineering Corporation, Quincy, Massachusetts. This apparatus determines the ultimate tensile strength of the film; that is, the number of pounds per square inch required to rupture the film when subjected to tensile stress. The figures are shown as "Average Ultimate Tensile Strength," since each figure is actually an average of many tests. Beside the value for the product of this example, we have also indicated the values of cellophane and cellulose acetate.

| Film: | Average ultimate tensile strength |
|---|---|
| Amylose acetate film of Example I | 8,422 |
| Cellophane | 6,743 |
| Cellulose acetate | 7,220 |

It is seen that the tensile strength of films of the amylose derivative is not only as good as that of cellophane or cellulose acetate, but even better.

*Example II*

In Example I, we described the preparation of an amylose acetate having a D.S. of 0.042. In this present example, we prepared an amylose acetate of a higher degree of substitution. In order to do this, we mixed 100 parts amylose with 567 parts dimethylsulfoxide, and after agitating for about two hours, we added 6 parts triethylamine, followed by an equal weight of acetic anhydride. After agitating for an additional two hours, the amylose product was precipitated in the manner described in Example I, dried, and ground.

The amylose derivative had a D.S. of 0.077. It was readily dispersed in water by heating, and formed a dispersion, at 10% solids, which remained viscosity-stable for more than 3 hours, with no discernible thickening or gelling being evident.

Films cast in the manner described in Example I, and tested for water resistance, were found to have excellent resistance to the action of water, showing no disintegration after soaking in water for two hours.

When the above example was repeated, except that the reaction mass of amylose, water, catalyst and acetic anhydride was allowed to remain under agitation for 16 rather than 2 hours, essentially the same results were obtained. The product had the same D.S. as above, dispersed easily in water upon heating, formed stable dispersions, and cast films of excellent water-resistance.

*Example III*

We repeated the acetylation reaction of Example I, except that in place of 4 parts each of triethylamine and acetic anhydride, respectively, we employed 6.27 parts of each of these chemicals. The resulting amylose acetate was separated and dried as described in that example. Its D.S. was 0.082. The product was found to disperse easily, by mere heating in water, and upon removing the dispersion from the boiling water bath it remained stable, with no discernible gelling, for approximately 10 hours (compare this to the matter of minutes that elapses before an aqueous dispersion of untreated amylose sets to a gel). Films cast from the dispersion were found to be substantially resistant to water.

*Example IV*

This example illustrates the use of propionic anhydride as the esterification reagent. 100 parts of amylose were mixed with 575 parts dimethylsulfoxide. The mixture was agitated at room temperature for two hours, to insure thorough and homogeneous dispersion of the amylose. There were then added 7.6 parts of triethylamine and 7.6 parts of propionic anhydride. After an additional 2 hours of agitation, the amylose propionate was precipitated in alcohol and separated, in the manner described in Example I. The product had a D.S. of 0.07. It was found to disperse readily upon cooking in water at ordinary pressures, and the dispersion remained stable for at least 1½ hours. Films cast from the aqueous dispersion were water-resistant.

In a variation of this example, the above procedure was repeated, except that in place of the stated amounts of triethylamine and propionic anhydride we used 13.2 parts each of triethylamine and n-butyric anhydride. The amylose derivative, having a D.S. of 0.06 dispersed readily and completely upon heating in water, the dispersions remaining stable for 3 to 4 hours. Films cast from the dispersions were notably resistant to the action of water.

In a further variation, we employed 13.2 parts each of triethylamine and of iso-butyric anhydride, the other materials and procedures being as stated above. The product dispersed readily upon heating in water, the dispersions showing no signs of gelling for at least ½ hour. Films cast from the dispersions were characterized by excellent water resistance, when tested in the manner described in the first example.

*Example V*

This example illustrates the use of benzoic anhydride as an esterification reagent. 100 parts amylose were thoroughly dispersed in 570 parts dimethylsulfoxide, by agitating for 2 hours. There were then added 20.4 parts each of triethylamine and benzoic anhydride. After two hours of additional agitation, the mass was poured into an excess of ethyl alcohol, and the precipitated amylose benzoate removed by filtration and dried. The product had a D.S. of 0.11. It dispersed completely upon heating in water, and a dispersion of 10% solids remained viscosity-stable for at least one hour. Films cast from the dispersion were found to be clear, flexible and insoluble in water, when tested in the manner already described.

*Example VI*

This example illustrates a series of etherification reactions upon amylose, to provide low-substituted derivatives of the desired characteristics.

(a) In all cases, the amylose was first prepared for the reaction by dispersing in a 5% aqueous sodium hydroxide solution. Specifically, 100 parts of amylose were mixed in 560 parts of water containing 30% sodium hydroxide based on the dry weight of the amylose. Agitation was maintained until complete dispersion of the amylose was achieved (ordinarily about 1 to 2 hours). The dispersion was then ready for addition of the etherification reagent.

(b) To an alkaline dispersion of 100 parts of amylose, prepared as in (a) above, we added slowly 18 parts of dimethyl sulfate. The reaction mixture was kept under agitation for 16 hours, at room temperature, at which time the pH was brought down to 5.5 by the addition of glacial acetic acid. The reaction mass was then poured into an excess of ethyl alcohol, to precipitate the amylose derivative. This was filtered off and dried, and found to have a D.S. of 0.15. The amylose product dispersed partially by mere mixing in cold water, and dispersed completely and readily upon heating in water. The dispersion remained stable for at least an hour at room temperature, before any gelling was discernible. Films were formed and tested for water-resistance as described in Example I. The films of this product were found to be water-resistant.

(c) To the alkaline amylose dispersion of (a), we slowly added 9 parts of ethyl bromide, and continued agitation of the reaction mass for 16 hours at room temperature. The pH was then adjusted to approximately 5.5, and the amylose precipitated by mixing the reaction mass with an excess of alcohol. The amylose product was filtered and dried, and upon analysis proved to have a D.S. of 0.07. It dispersed readily upon heating in water, showing no gelling tendencies for at least 18 hours. Films formed from the dispersion were found to be water-resistant.

(d) To the alkaline amylose dispersion of (a), containing 100 parts amylose, we added 6 parts of allyl bromide. Agitation of the reaction mass was continued at room temperature for 16 hours, followed by adjustment of the pH to approximately 5.5. The amylose derivative was then precipitated by pouring the reaction mass into an excess of ethyl alcohol, followed by filtration and drying. The product had a D.S. of 0.07. The product dispersed readily upon heating in water, and a dispersion of 10% solids remained stable at room temperature for about 2 hours. Films cast from the aqueous dispersion and dried were found to be notably water resistant.

(e) To the alkaline amylose dispersion of (a), containing 100 parts amylose, we slowly added 6 parts propylene oxide. After 16 hours agitation at room temperature, the amylose product was precipitated by admixture of the reaction mass with excess ethyl alcohol, the precipitate being filtered off and dried. This product had a D.S. of 0.08. Heating in water caused the amylose derivative to disperse readily, and a dispersion of 10% solids was found to remain viscosity-stable for at least 72 hours, before any gelling was evident. Films cast from the dispersion were water resistant.

(f) To the alkaline dispersion of (a), containing 100 parts amylose, we added 10 parts benzyl chloride. After 16 hours agitation at room temperature, the amylose derivative was precipitated by pouring the reaction mass into an excess of ethyl alcohol, followed by filtration and drying of the precipitate. The D.S. of the product was 0.03. The product was dispersed easily, by heating in water, and dispersions of 10% solids remained stable for at least ½ hour. Films cast from the dispersions and dried were found to be thereafter insoluble in water.

(g) To the dispersion of (a), containing 100 parts amylose, we slowly added 15 parts of monochloracetic acid. Agitation was continued for approximately 16 hours, at room temperature, whereupon the amylose derivative was precipitated, separated and dried, in the manner described in the previous examples. The D.S. of this product was 0.05. The product dispersed rapidly in water upon heating, to form a dispersion which, at 10% solids, remained stable against gelling for at least 1½ hours. Films cast from the dispersion and dried were thereafter water-resistant.

(h) To the dispersion of (a), containing 100 parts amylose we added 2 parts of acrylonitrile. In this case, agitation was maintained for only 3 hours after addition of the acrylonitrile. The reaction mass was acidified to pH 5–6 and then poured into an excess of ethyl alcohol, thereby precipitating the amylose derivative, which was filtered off and dried. Analysis indicated a D.S. of 0.04. Dispersion was effected easily by heating in water, and dispersions of 10% solids remained stable for at least 16 hours. Films cast from the dispersions and dried were thereafter resistant to the action of water.

*Example VII*

This example illustrates the esterification of amylose in an aqueous medium. 100 parts amylose were dispersed in 560 parts water containing 30 parts sodium hydroxide, by agitating at room temperature for 2 hours. Then there was slowly added a solution of 35.6 parts of acetic anhydride dissolved in glacial acetic acid; vigorous agitation was maintained. The purpose of the glacial acetic acid was to insure quick neutralization of the excess of sodium hydroxide, in order to prevent hydrolysis of the amylose ester. After the reaction was complete, the reaction was allowed to cool and gel, and the gel was ground and washed with water. When the amylose derivative was redispersed by heating in water at 120° C., at 10% concentration, the resulting dispersion produced films which when dried were notably insoluble in water. The D.S. of the derivative was found to be 0.037.

Similar results were obtained when the amylose acetate was recovered from the esterification reaction mass by precipitation with alcohol or by drying over heated drums.

*Example VIII*

This example illustrates the esterification of a hybrid high-amylose corn starch, containing approximately 54% amylose.

Following the general procedure indicated in Example VI, 100 parts of "amylomaize" high-amylose corn starch were dispersed in 585 parts of water containing 15 parts sodium hydroxide, and agitated at room temperature for 2 hours. There was then added 10 parts of acetic anhydride mixed with 16 parts of glacial acetic acid. When the reaction was complete, the mass was poured into an excess of ethyl alcohol to precipitate the acetylated derivative. The product, which had a D.S. of 0.017, dispersed in water by ordinary cooking, at 10% concentration, and only after 16 hours of aging formed a soft gel. Films cast from the dispersion were found to be insoluble after drying.

In a variation of this example, we mixed 100 parts of the same high-amylose corn starch with 125 parts water, and adjusted the pH to 7.0 by the addition of a 3% aqueous sodium hydroxide solution. There was then added 3 parts of maleic anhydride, in ½ part portions, maintaining the pH at 7.0 during the addition of the anhydride, by the use of NaOH solution. 7½ parts of sodium bisulfite were added, and the reaction mass was agitated overnight at room temperature. The starch derivative was then filtered, washed with water and dried. It was found to disperse readily in water with simple heating.

In still another variation, the sulfate derivative was formed by mixing 50 parts of the high-amylose starch with 75 parts of water containing 0.4 parts NaOH, and adding 0.75 parts of the addition product of trimethylamine and sulfur trioxide. The reaction mass was agitated overnight, whereupon the pH was adjusted to approximately 5, and the starch sulfate was filtered off, washed with water and dried. Here too, it was found that, unlike the corresponding untreated starch, the derivative dispersed readily in water with simple heating.

*Example IX*

This example illustrates the introduction of controlled branching on amylose by treatment with beta-propiolactone.

100 parts amylose were mixed with 567 parts dimethylsulfoxide. After approximately 2 hours of continuous agitation at room temperature, there were added 4 parts of triethylamine followed by 1.04 part beta-propiolactone. The mixture was agitated for an additional 2 hours, at which time the reaction mass was poured into an excess of ethyl alcohol. The precipitated amylose derivative was filtered off and dried. The D.S. of the product was 0.02. The material dispersed readily in water, at 10% concentration, with simple heating, to form a dispersion that was measurably more stable than that made from the untreated amylose. Films cast from the dispersion were characterized by improved water resistance.

*Example X*

This example illustrates the treatment of amylose with the anhydride of a dibasic acid, resulting in the acid ester.

100 parts amylose were mixed with 560 parts of dimethylsulfoxide, and stirred for approximately two hours at room temperature. To the uniform dispersion there were then added 14.3 parts of triethylamine, followed by slow addition of 7 parts of maleic anhydride. The mixture was agitated for an additional two hours, and the reaction mass was then poured into an excess of ethyl alcohol. The acid ester of amylose which thus precipitated was filtered off and dried in a current of warm air.

The D.S. of the product was approximately 0.09. It dispersed in water, with moderate heating, to form stable dispersions which resisted gelling, or even when gelling did eventually occur redispersed easily with agitation. Films cast from the dispersion, and dried, were notably water-resistant.

Similar results were obtained in two variations, using, respectively, octenyl succinic anhydride and phthalic anhydride as the reagents.

*Example XI*

As a modification of the herein described process, coming within the scope of this invention, one may mix the amylose dispersion with the etherification or esterification reagent and the alkaline material (if the latter be required) and pass the entire mixture over heated revolving drums. The reaction thus takes place on the drums, and the amylose derivative is obtained in dried form, requiring nothing more than grinding to put it into condition for use.

50 parts of "amylomaize" high-amylose corn starch (containing approximately 54% amylose) were dispersed in 71.6 parts water. To the slurry there were added 28.4 parts of 88% formic acid (reagent) and 16.2 parts urea (acid-acceptor). The slurry was passed over a slowly revolving drum heated to approximately 120° C. The resulting dry derivative was removed from the drum and ground to a fine mesh. When heated in water at 10% concentration, it dispersed uniformly, and the dispersion remained stable for at least two or three hours, the amylose in said dispersion having a D.S. of approximately 0.15. Films cast from the dispersion were characterized by good water-resistance.

*Example XII*

In this variation of our process, one material combines the functions of dispersing medium and esterification reagent.

50 parts of amylose were suspended in 200 parts of 87% formic acid, and agitated at room temperature until the amylose was completely dispersed (24 to 48 hours). The reaction mass was then poured into an excess of vigorously agitated water, thus precipitating the amylose derivative, which was filtered, washed and air dried.

The derivative dispersed in water, with ordinary heating, and a dispersion of 10% solids remained stable for from 3 to 5 hours at room temperature. A self-supporting film cast from this dispersion (wherein the amylose derivative had a D.S. of about 0.15) was clear, flexible and water-resistant.

In summary, it is seen that we have provided a means of making an amylose derivative which on the one hand retains the desirable amylose characteristics (especially the ability to form strong, flexible, water-resistant films), and on the other hand differs from untreated amylose in dispersing easily in water with ordinary heating, to give stable dispersions of better stability in which the tendency to gel formation is substantially retarded. We accomplish this by the derivatization of amylose, within a given range of substitution, namely, D.S. 0.02 to 0.15. In this connection, it must be remembered that one is dealing here with a great number of variables, including the choice of esterification or etherification reagents, the various ways of dispersing the amylose for the reaction, and the duration and temperature of the reaction. Thus, for a given reagent and a specific set of reaction conditions, it is conceivable that the upper limit of substitution (D.S. 0.15) may be higher than desirable, or, on the other hand, that one can obtain a somewhat higher degree of

We claim:
1. An amylose derivative selected from the class consisting of esters and ethers of amylose comprising amylose whose molecule contains substituent branches to an extent equivalent to a degree of substitution within the range of approximately 0.02 to 0.15, said amylose derivative being characterized by more ready dispersibility in water to form more stable dispersions, as compared to the corresponding untreated amylose, and the ability to form water-resistant films.

2. The product of claim 1 in which the derivative is the reaction product of amylose with an esterification reagent selected from the class consisting of organic acid anhydrides, beta-propiolactone, and the addition product of trimethylamine and sulfur trioxide.

3. The product of claim 1 in which the derivative is the reaction product of amylose with an etherification reagent selected from the class consisting of acrylonitrile, dimethyl sulfate, monochloracetic acid, benzyl chloride, propylene oxide, ethyl bromide and allyl bromide.

4. The product of claim 1 in which the amylose is obtained from the fractionation of starch.

5. The product of claim 1 in which the amylose is an unseparated component of a starch which contains at least 50% amylose.

References Cited in the file of this patent

UNITED STATES PATENTS

| | | |
|---|---|---|
| 2,541,773 | Lolkema et al. | Feb. 13, 1951 |
| 2,599,620 | Filbert | June 10, 1952 |
| 2,608,723 | Wolff et al. | Sept. 2, 1952 |
| 2,656,571 | Davis et al. | Oct. 27, 1953 |
| 2,802,000 | Caldwell | Aug. 6, 1957 |
| 2,822,581 | Muetgeert et al. | Feb. 11, 1958 |

OTHER REFERENCES

"Industrial and Engineering Chemistry," vol. 36, 1944, pp. 796–798.

"Journal American Chemical Society," vol. 67, 1945, pp. 1164 and 1165.

Wolff et al.: "Journal American Chemical Society," vol. 73, 1951, pp. 346–349.